(12) United States Patent
Hong et al.

(10) Patent No.: US 9,942,530 B2
(45) Date of Patent: Apr. 10, 2018

(54) PROJECTION SYSTEM AND LIGHT SCREEN GENERATING DEVICE THEREOF

(71) Applicants: EVEREST DISPLAY INC., Hsinchu (TW); SEAN & STEPHEN CORPORATION, Taipei (TW)

(72) Inventors: Hei-Tai Hong, Hsinchu County (TW); Yueh-Hong Shih, Hsinchu (TW); Chi-Jung Chen, New Taipei (TW); Gang-Liang Wey, Tainan (TW); Hsin-Chin Chen, Tainan (TW)

(73) Assignees: EVEREST DISPLAY INC., Hsinchu (TW); SEAN & STEPHEN CORPORATION, Taipei (TW)

( * ) Notice: Subject to any disclaimer, the term of this patent is extended or adjusted under 35 U.S.C. 154(b) by 0 days.

(21) Appl. No.: 15/588,511

(22) Filed: May 5, 2017

(65) Prior Publication Data

US 2017/0347077 A1 Nov. 30, 2017

(30) Foreign Application Priority Data

May 27, 2016 (TW) .............................. 105116632 A

(51) Int. Cl.
| | | |
|---|---|---|
| *G03B 21/56* | (2006.01) | |
| *H04N 9/31* | (2006.01) | |
| *G06F 3/042* | (2006.01) | |

(52) U.S. Cl.
CPC ........... *H04N 9/3191* (2013.01); *G03B 21/56* (2013.01); *G06F 3/0421* (2013.01); *G03B 2206/00* (2013.01)

(58) Field of Classification Search
CPC ...... G03B 21/10; G03B 21/56; G03B 21/145; G03B 21/608; G03B 21/2013;
(Continued)

(56) References Cited

U.S. PATENT DOCUMENTS

| | | | | |
|---|---|---|---|---|
| 2006/0072076 A1* | 4/2006 | Smoot | ................... | G03B 15/10 353/34 |
| 2009/0015798 A1* | 1/2009 | Unsworth | .............. | G03B 21/10 353/79 |

FOREIGN PATENT DOCUMENTS

| | | |
|---|---|---|
| CN | 101026717 A | 8/2007 |
| CN | 101169582 A | 4/2008 |

(Continued)

*Primary Examiner* — Sultan Chowdhury
(74) *Attorney, Agent, or Firm* — Li & Cai Intellectual Property (USA) Office

(57) ABSTRACT

The present disclosure provides a projection system and a light screen generating device thereof. The light screen generating device includes a movable carrier module, a first light-emitting module, and a second light-emitting module. The first light-emitting module includes a plurality of first light-emitting structures disposed on the movable carrier module. Each of the first light-emitting structures generates an invisible light screen, and the invisible light screens respectively generated by the first light-emitting structures are mated with each other to form a spliced invisible light screen for increasing light emission uniformity. The second light-emitting module includes a second light-emitting structure that is disposed on the movable carrier module and that generates a visible light screen parallel to and overlapping the spliced invisible light screen.

19 Claims, 10 Drawing Sheets

(58) Field of Classification Search
CPC ............ G03B 21/2053; G02B 27/0006; G02B 27/0093; G02B 27/144; G02B 27/2285; G02B 27/2292; H04N 13/0203; H04N 13/0278; H04N 13/0404; H04N 13/0409; H04N 13/0479
See application file for complete search history.

(56) References Cited

FOREIGN PATENT DOCUMENTS

| TW | 566572 | 12/2003 |
| TW | 201546533 A | 12/2015 |
| TW | M516293 U | 1/2016 |
| WO | WO 2015/146190 A1 | 10/2015 |

\* cited by examiner

PROJECTION SYSTEM AND LIGHT SCREEN GENERATING DEVICE THEREOF

BACKGROUND OF THE INVENTION

1. Field of the Invention

The present disclosure relates to a projection system and a light screen generating device thereof; in particular, to a projection system and a light screen generating device thereof capable of increasing the uniformity of an invisible light screen.

2. Description of Related Art

An interactive projection system allows users to perform touching operation on a projection plane. The interactive projection system utilizes an invisible light screen emitted from a light source device to cover the entire projection plane, so as to let the invisible light screen be reflected by a touching object and to generate reflected light beams when users interact with a projection picture on the projection plane, and further to generate a corresponding touch signal by using an invisible light detection device to receive the reflected light beams and to detect the touching location.

The distance between the invisible light screen and the projection plane can affect the touching operation considerably. To be more specific, if the distance between the invisible light screen and the projection plane appears to be too far, the touching object could easily fall into the area between the invisible light screen and the projection plane when users are inputting information by touch on the projection plane, which makes the light detection device detect incorrect touching locations so that unexpected touch signals may be generated. Inversely, if the distance between the invisible light screen and the projection plane appears to be too close, the reflected light beams could easily be blocked by the touching object when users are inputting information by touch on the projection plane, which leads to the light detection device's inability to accurately detect the touching location so that correct touch signals cannot be generated. Accordingly, the distance between the light screen and the projection plane must be adjusted to an appropriate value in order to regularly input information by touch.

However, the conventional invisible light screen has the problem of insufficient uniformity. Specifically, when the light screen sweeps over the upper section of the left-side portion and the right-side portion of the projection plane, it may be unable to uniformly cover the entire projection area due to excessive darkness. Therefore, developing modifications that can overcome the abovementioned flaws has become a critical issue in the art.

SUMMARY OF THE INVENTION

The object of the present disclosure is to provide a projection system and a light screen generating device thereof capable of solving the current technical issues in the conventional art.

For this purpose, a light screen generating device is provided. The light screen generating device includes: a movable carrier module; a first light-emitting module including a plurality of first light-emitting structures disposed on the movable carrier module, each first light-emitting structure generating an invisible light screen, the invisible light screens respectively generated by the first light-emitting structures being mated with each other to form a spliced invisible light screen for increasing light emission uniformity; and a second light-emitting module including a second light-emitting structure that is disposed on the movable carrier module and that generates a visible light screen parallel to and overlapping the spliced invisible light screen. The spliced invisible light screen and the visible light screen correspond to a projection area of the projection screen, and the first light-emitting module and the second light-emitting module, through the movement of the movable carrier module, synchronously adjust a parallelism of the visible light screen and the spliced invisible light screen corresponding to the projection area of the projection screen. The visible light screen is close to and covers the projection area of the projection screen for determining a flatness of the projection area of the projection screen.

Furthermore, the movable carrier module includes a movable carrier base for carrying the first light-emitting module and the second light-emitting module, and an adjusting mechanism disposed on the movable carrier base. The adjusting mechanism includes a joint pivot structure, a levelness adjusting structure for adjusting a levelness of the movable carrier base corresponding to the projection area, and an inclination adjusting structure for adjusting an inclination of the movable carrier base corresponding to the projection area.

For this purpose, a projection device is also provided. The projection device includes: a projection screen having a projection area; a projection device disposed in front of the projection screen, and that projects an image light source on the projection area of the projection screen; and a light screen generating device disposed above the projection area of the projection screen. The light screen generating device includes: a movable carrier module; a first light-emitting module including a plurality of first light-emitting structures disposed on the movable carrier module, each first light-emitting structure generating an invisible light screen, the invisible light screens respectively generated by the first light-emitting structures being mated with each other to form a spliced invisible light screen for increasing light emission uniformity; and a second light-emitting module including a second light-emitting structure disposed on the movable carrier module and generating a visible light screen parallel to and overlapping the spliced invisible light screen. The spliced invisible light screen and the visible light screen correspond to a projection area of the projection screen, and the first light-emitting module and the second light-emitting module, through the movement of the movable carrier module, synchronously adjust a parallelism of the visible light screen and the spliced invisible light screen corresponding to the projection area of the projection screen. The visible light screen is close to and covers the projection area of the projection screen for determining a flatness of the projection area of the projection screen.

Furthermore, the projection device and the light screen generating device are separate from each other, the projection device including a projection lens and a wireless signal transmitter, and the light screen generating device including a wireless signal receiver corresponding to the wireless signal transmitter. The projection device provides to the projection lens a lens turning-off-and-on timing signal that is transmitted wirelessly to the wireless signal receiver. The light screen generating device turns on or off the first light-emitting module according to the lens turning-off-and-on timing signal received by the wireless signal receiver.

The effects of the projection system and a light screen generating device thereof provided by the present disclosure are achieved by the design of "the first light-emitting module including a plurality of first light-emitting structures disposed on the movable carrier module" and "each first light-emitting structure generates an invisible light screen, and the invisible light screens respectively generated by the first light-emitting structures are mated with each other to form a spliced invisible light screen for increasing light emission uniformity," in which the situation of "the light screen being unable to uniformly cover the entire projection area of the projection screen due to excessive darkness" can be prevented, which further increases the light uniformity of the spliced invisible light screen.

Furthermore, the projection system and the light screen generating device thereof provided by the present disclosure, by the design of "the second light-emitting module including a second light-emitting structure disposed on the movable carrier module, and the second light-emitting structure generating a visible light screen parallel to and overlapping the spliced invisible light screen" and "the visible light screen being close to and covering the projection area of the projection screen for determining a flatness of the projection area of the projection screen," can improve the flatness of the projection area of the projection screen.

Furthermore, the projection system and a light screen generating device thereof provided by the present disclosure, by the design of "the projection device includes a projection lens and a wireless signal transmitter, and the light screen generating device includes a wireless signal receiver corresponding to the wireless signal transmitter" and "the lens turning-off-and-on timing signal of the projection lens is transmitted wirelessly to the wireless signal receiver, and the light screen generating device turns on or off the first light-emitting module according to the lens turning-off-and-on timing signal received by the wireless signal receiver," can simultaneously turn on and off the projection lens of the projection device and the first light-emitting module of the light screen generating device according to the lens turning-off-and-on timing signal.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Referring to FIGS. 1-9, the present disclosure provides a light screen generating device D, which can be applied to a projection screen C, and the projection screen C has a projection area C10. The light screen generating device D includes a movable carrier module 1, a first light-emitting module 2 and a second light-emitting module 3.

Figure 1:
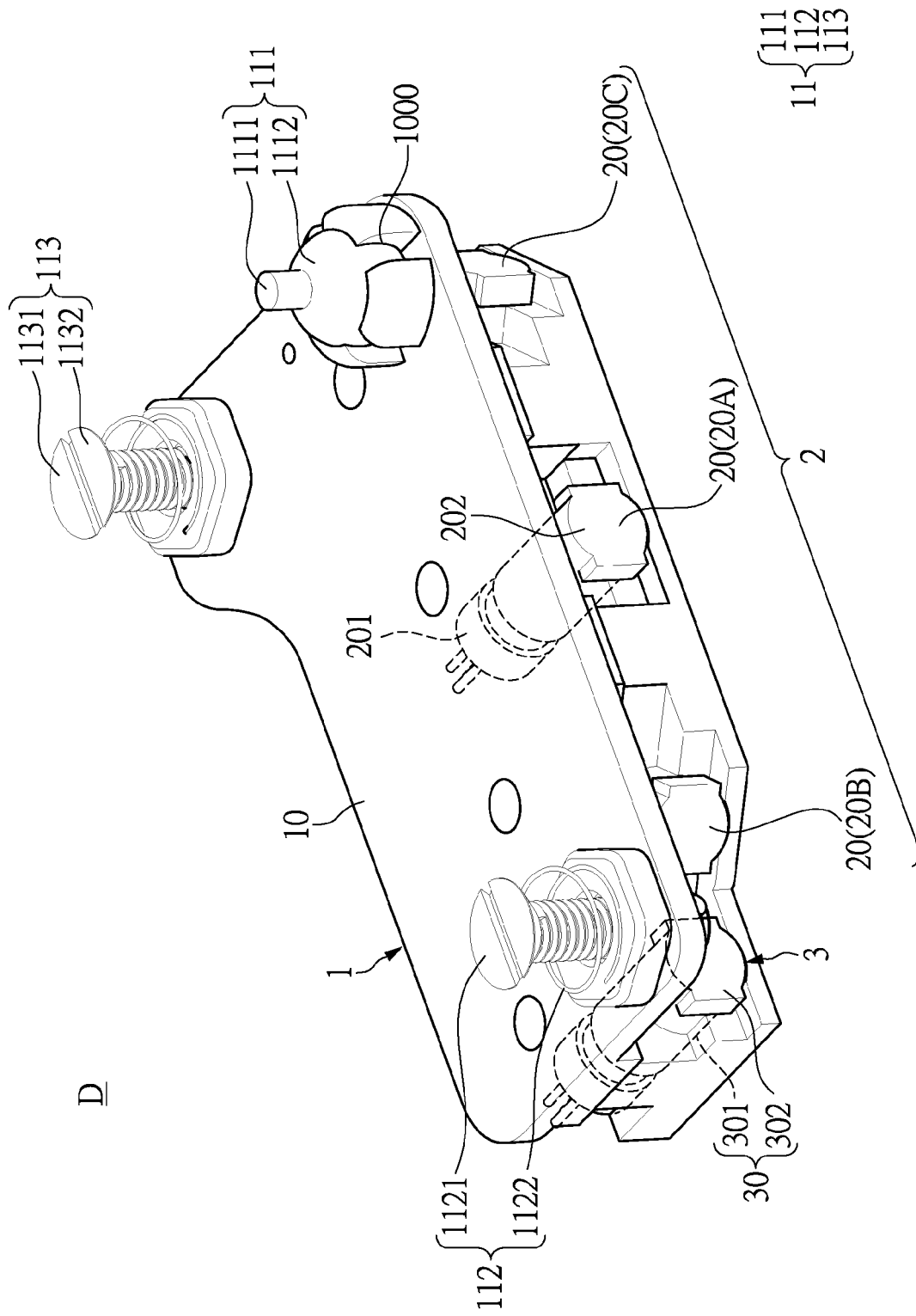
FIG. 1 shows a 3D diagram of the light screen generating device according to the present disclosure.
Figure 4:
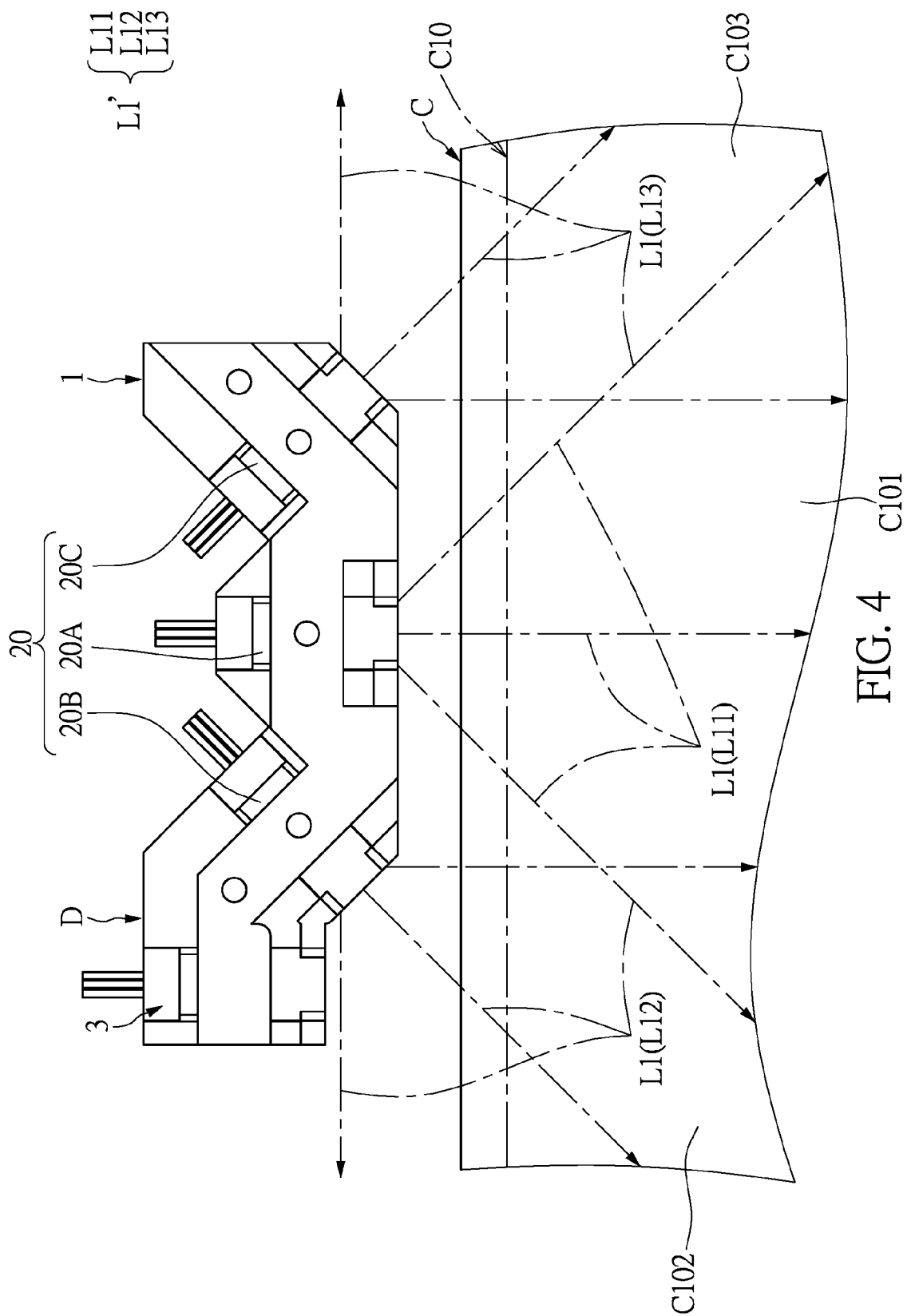
FIG. 4 is a top view of the light screen generating device according to the present disclosure illustrating a portion of a movable carrier base being temporarily removed and each first light-emitting structure generating a invisible light screen.

Reference is firstly made to FIG. 1 and FIG. 4. The movable carrier module 1 includes a movable carrier base 10 carrying the first light-emitting module 2 and the second light-emitting module 3, and an adjusting mechanism 11 disposed on the movable carrier base 10. Moreover, the adjusting mechanism 11 includes a pivot structure 111, a levelness adjusting structure 112 for adjusting a levelness of the movable carrier base 10 corresponding to the projection area C10, and an inclination adjusting structure 113 for adjusting an inclination of the movable carrier base 10 corresponding to the projection area C10.

Figure 2:
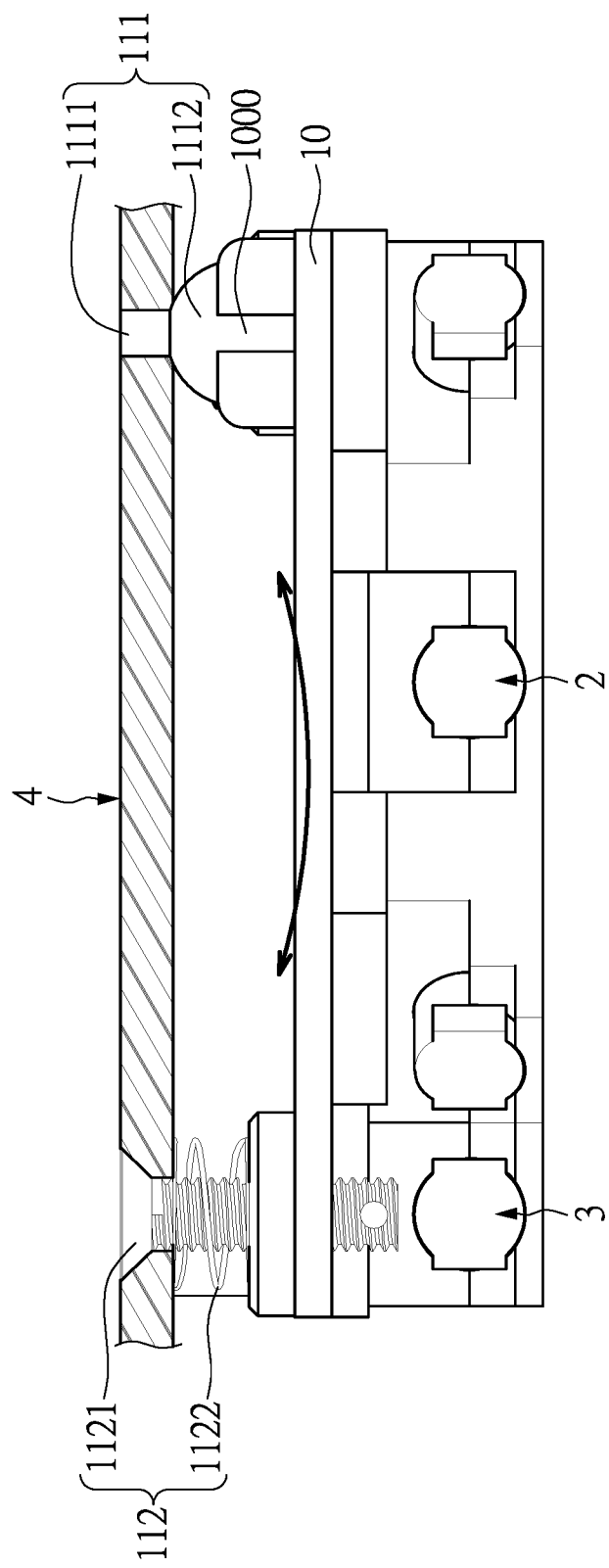
FIG. 2 is a side view of the light screen generating device according to the present disclosure.
Figure 3:
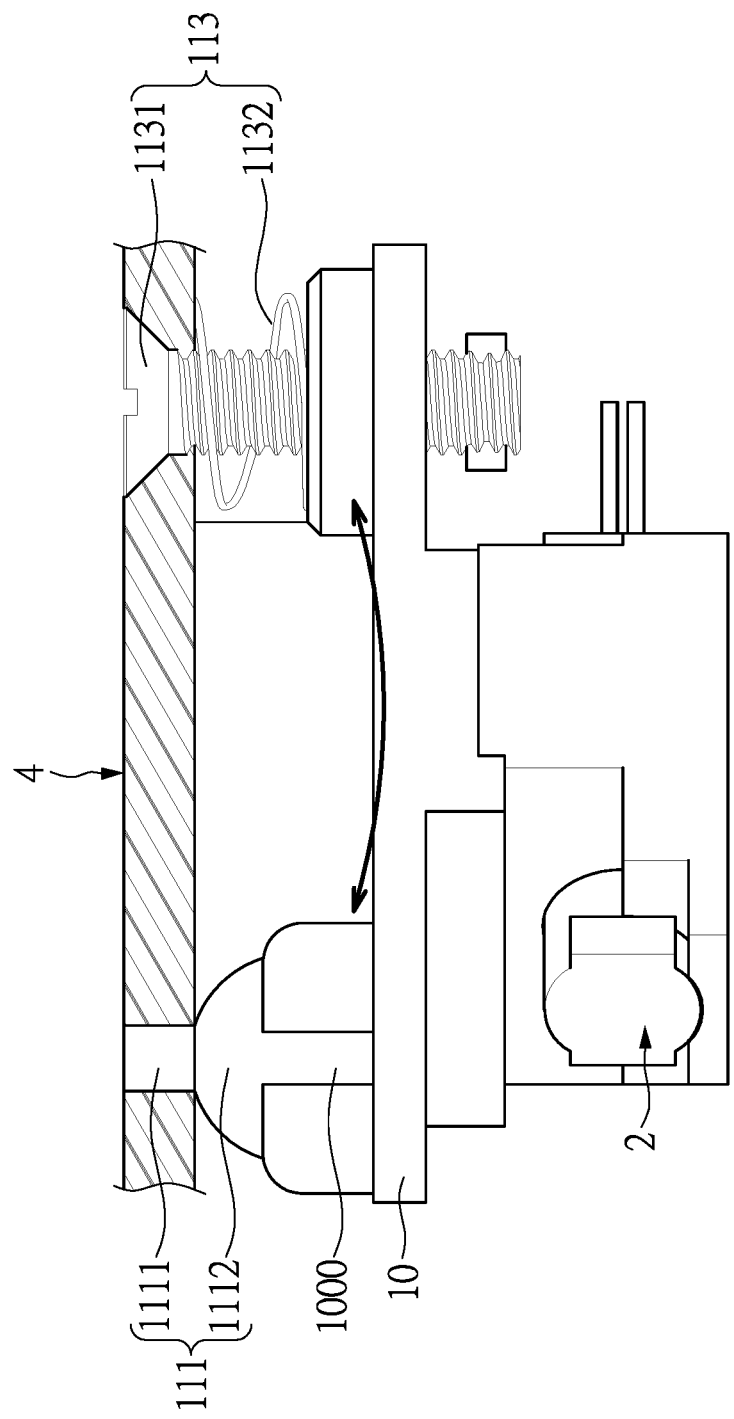
FIG. 3 is another side view of the light screen generating device according to the present disclosure.

For example, referring to FIGS. 1-3, the pivot structure 111 includes a fixing part 1111 fixed on an outer shell 4, and a pivot part 1112 connected to the fixing part 1111 and movably contained in a pivot slot 1000 of the movable carrier base 10. Furthermore, the levelness adjusting structure 112 includes a first adjusting screw 1121 passing through the outer shell 4 and the movable carrier base 10, and a first elastic element 1122 sleeving on the first adjusting screw 1121 and disposed between the outer shell 4 and the movable carrier base 10. The inclination adjusting structure 113 includes a second adjusting screw 1131 passing through the outer shell 4 and the movable carrier base 10, and a second elastic element 1132 sleeving on the second adjusting screw 1131 and disposed between the outer shell 4 and movable carrier base 10.

Figure 5:
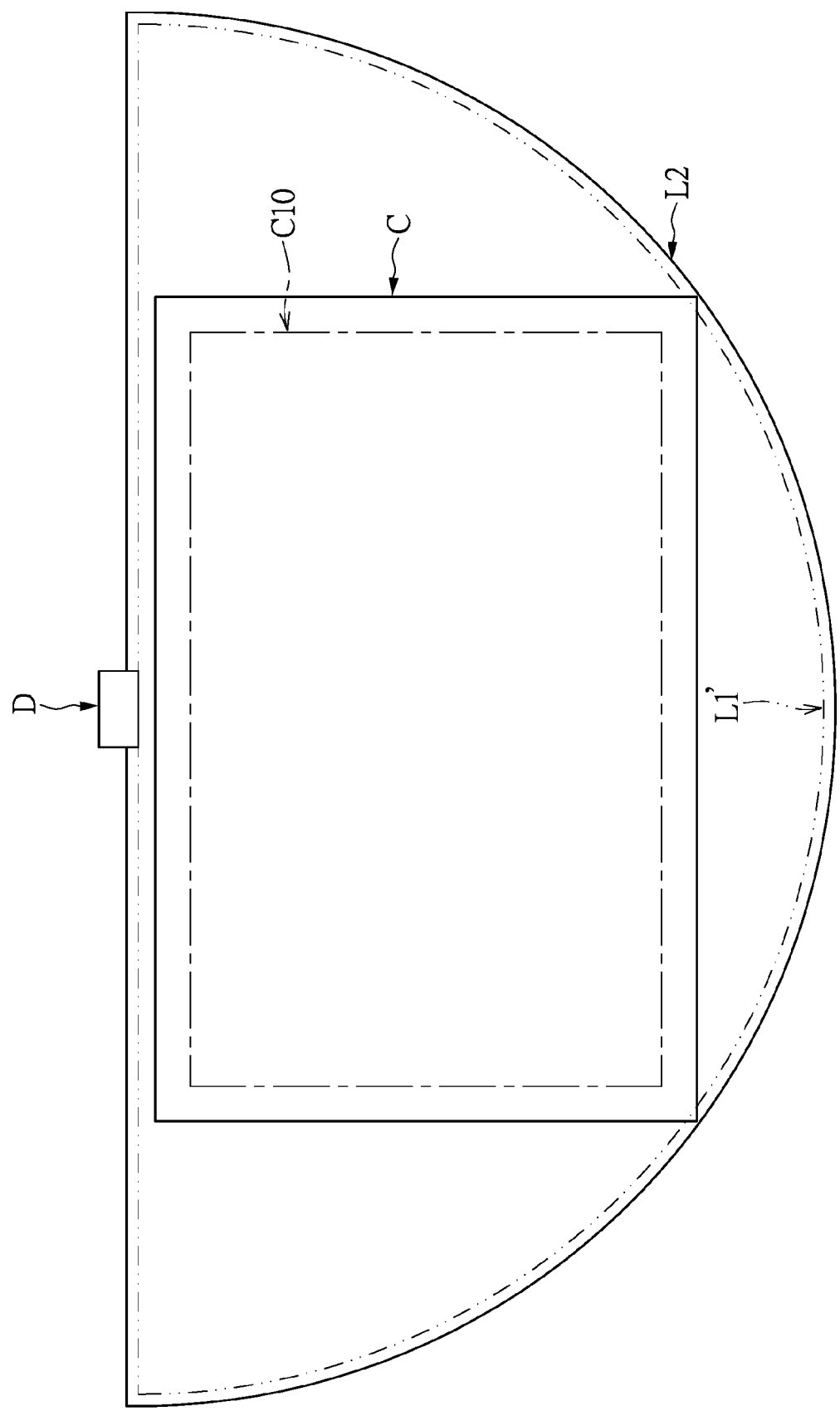
FIG. 5 is a top view of the first light-emitting module and the second light-emitting of the light screen generating device respectively generating a spliced invisible light screen and a visible light screen.

Furthermore, referring to FIGS. 1, 4-5, the first light-emitting module 2 includes a plurality of first light-emitting structures 20 disposed on the movable carrier module 1, each first light-emitting structure 20 generating an invisible light screen L1, and the invisible light screens L1 generated by the first light-emitting structures 20 being parallel with each other. Further, the invisible light screens L1 respectively generated by the first light-emitting structures 20 are mated and complementary with each other to form a spliced invisible light screen L1' for increasing light emission uniformity. The spliced invisible light screen L1' corresponds to a projection area C10 of the projection screen C.

For example, with references made to FIG. 1 and FIG. 4, each first light-emitting module 20 includes an infrared light-emitting element 201 and a first pillar mirror 202 disposed in front of the infrared light-emitting element 201, and the infrared beams generated by the infrared light-emitting element 201 may pass through the first pillar mirror 202, so as to span into an invisible light screen L1 with larger a coverage. On the other hand, the first light-emitting module 2 includes a middle light-emitting structure 20A for generating a middle invisible light screen L11, a left-side light-emitting structure 20B for generating a left-side inclination invisible light screen L12, and a right-side light-emitting structure 20C for generating a right-side inclination invisible light screen L13. Moreover, the left-side light-emitting structure 20B is disposed tiltedly relative to the middle light-emitting structure 20A and is disposed at the left side of the middle light-emitting structure 20A. The right-side light-emitting structure 20C is disposed tiltedly relative to the middle light-emitting structure 20A and is disposed at the right side of the middle light-emitting structure 20A.

As stated above, as shown in FIG. 4, the middle invisible light screen L11 corresponds to a middle portion C101 of the projection area C10, the left-side inclination invisible light screen L12 and the middle invisible light screen L11 overlap partially and correspond to a left-side portion C102 of the projection area C10, and the right-side inclination invisible light screen L13 and the middle invisible light screen L11 overlap partially and correspond to a right-side portion C103 of the projection area C10. Therefore, since the middle invisible light screen L11, the left-side inclination invisible light screen L12 and the right-side inclination invisible light screen L13 would respectively and uniformly correspond to and cover the middle portion C101, the left-side portion C102 and the right-side portion C103 of the projection area C10, the spliced invisible light screen L1' can uniformly correspond and cover the entire projection area C10 of the projection screen C. Therefore, the situation of "the light screen being unable to uniformly cover the entire projection area due to excessive darkness" can be prevented, which further increases the light uniformity of the spliced invisible light screen L1'.

Moreover, with references made to FIG. 1 and FIG. 5, the second light-emitting module 3 includes a second light-emitting structure 30 disposed on the movable carrier module 1. The second light-emitting structure 30 generates a visible light screen L2 which is parallel to and overlaps the spliced invisible light screen L1', and the visible light screen L2 corresponds to the projection area C10 of the projection screen C. For example, the second light-emitting structure 30 includes an infrared light-emitting element 301 and a second pillar mirror 302 disposed in front of the infrared light-emitting element 301, and the infrared beams generated by the infrared light-emitting element 301 may pass through the second pillar mirror 302, so as to span into the visible light screen L2 with a larger coverage.

Figure 6:
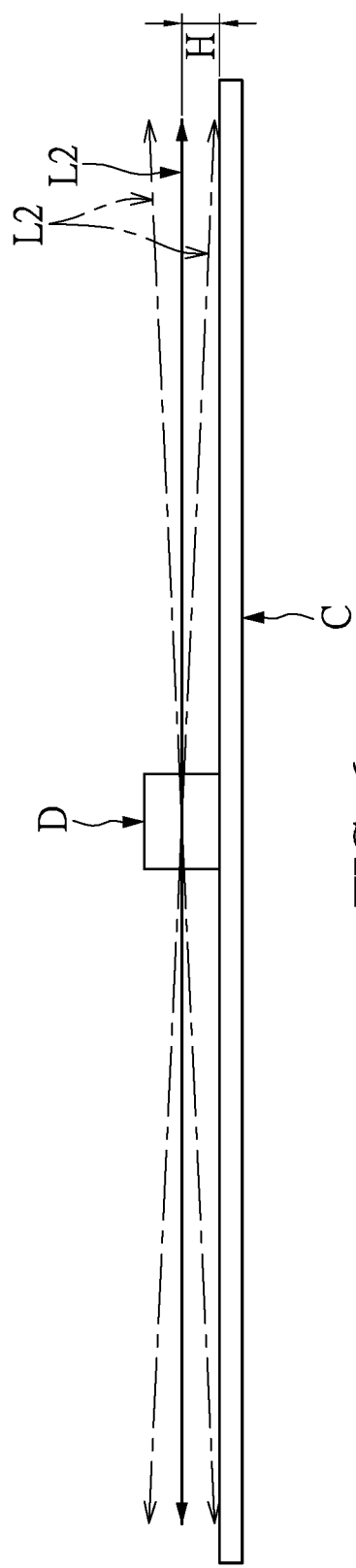
FIG. 6 is a side view of the second light-emitting module of the light screen generating device generating a visible light screen.

To be more precise, with references made to FIGS. 1, 2 and 6, when the pivot structure 111 and the inclination adjusting structure 113 act as two pivots, the present disclosure can easily rotate clockwisely or counter-clockwisely through the first adjusting screw 1121 to adjust the levelness (as indicated by the arrow in FIG. 2) of the movable carrier base 10 with respect to the projection area C10. The first light-emitting module 2 and the second light-emitting module 3, through the movement of the movable carrier module 10, synchronously adjust a levelness of the visible light screen L2 and the spliced invisible light screen L1' corresponding to the projection area C10 of the projection screen C. For example, as shown in FIG. 6, in order for the visible light screen L2 and the spliced invisible light screen L1' to reach the desired levelness, the visible light screen L2 shown in dotted lines must be adjusted to the visible light screen L2 shown in solid lines. That is to say, from a side view of FIG. 6, the entire visible light screen L2 should be distanced from the projection area C10 of the projection screen C at a predetermined distance H.

Figure 7:
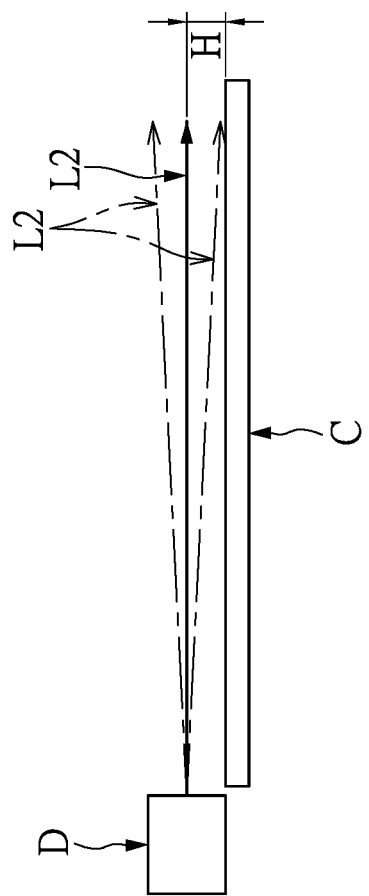
FIG. 7 is another side view of the second light-emitting module of the light screen generating device generating a visible light screen.

As stated above, with references made to FIGS. 1, 3 and 7, when the pivot structure 111 and the levelness adjusting structure 112 act as two pivots, the present disclosure can easily rotate clockwisely or counter-clockwisely through the second adjusting screw 1131 to adjust the levelness (as indicated by the arrow in FIG. 3) of the movable carrier base 10 with respect to the projection area C10. The first light-emitting module 2 and the second light-emitting module 3, through the movement of the movable carrier module 10, synchronously adjust a levelness of the visible light screen L2 and the spliced invisible light screen L1' corresponding to the projection area C10 of the projection screen C. For example, as shown in FIG. 7, in order for the visible light screen L2 and the spliced invisible light screen L1' to reach the desired levelness, the visible light screen L2 shown in dotted lines must be adjusted to the visible light screen L2 shown in solid lines. That is to say, from a side view of FIG. 7, the entire visible light screen L2 should be distanced from the projection area C10 of the projection screen C at a predetermined distance H.

That is, with references made to FIGS. 1-3 and 6-7, the first light-emitting module 2 and the second light-emitting module 3, through the movement of the movable carrier module 10, synchronously adjust a parallelism (i.e., levelness and inclination) of the visible light screen L2 and the spliced invisible light screen L1' corresponding to the projection area C10 of the projection screen C.

Figure 8:
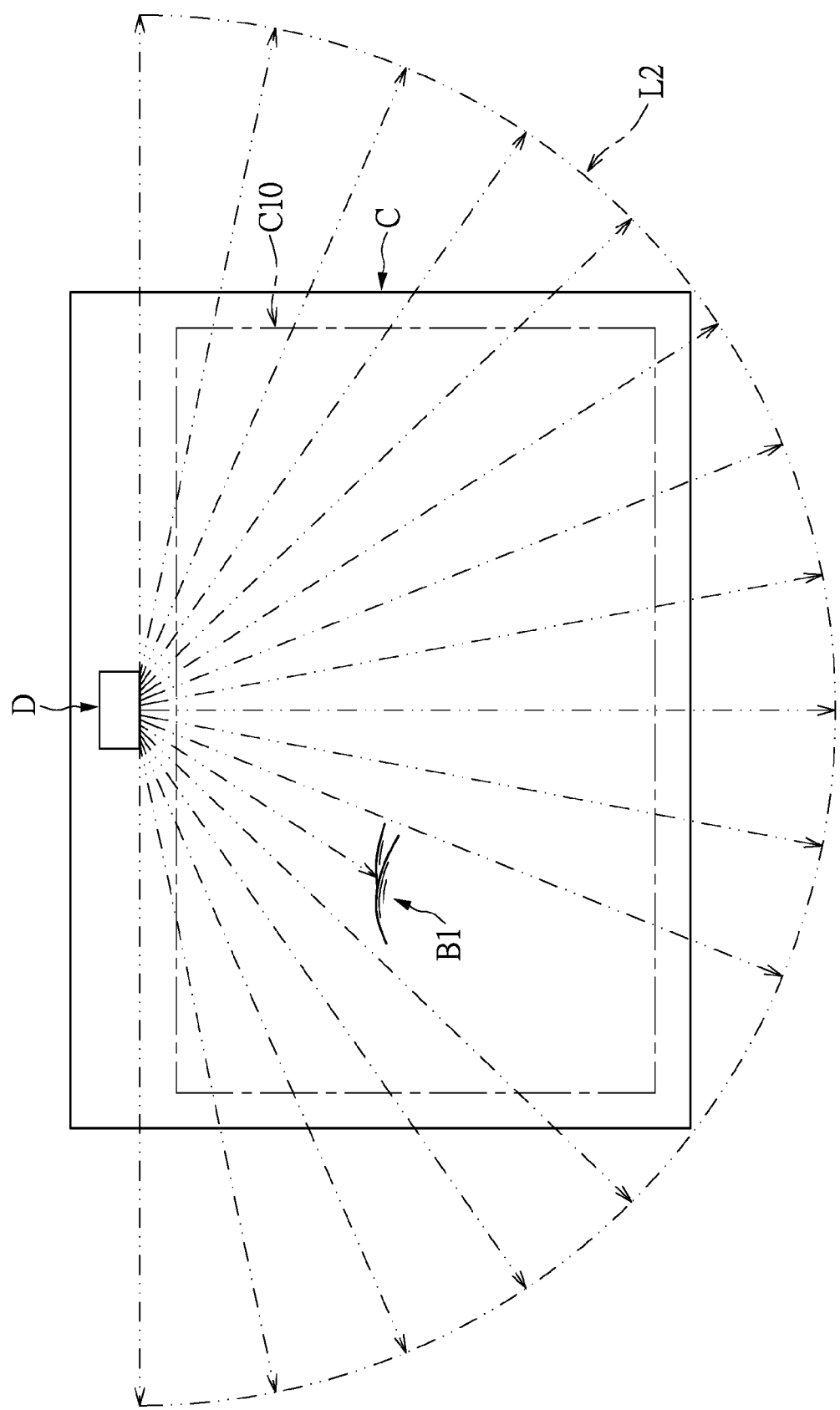
FIG. 8 is a top view of the visible light screen generated by the second light-emitting module of the light screen generating device projected on a warpage.

Furthermore, with references made to FIGS. 6-8, after the parallelism of the visible light screen L2 and the spliced invisible light screen L1' corresponding to the projection area C10 of the projection screen C is adjusted (as shown in FIG. 6 and FIG. 7), the light screen L2 would detect a top of the projection area C10 of the projection screen C to determine whether the projection area C10 of the projection screen C warps and contacts the visible light screen L2. In other words, when the projection area C10 warps and a warpage B1 is formed, a portion of the visible light screen L2 would project on the warpage B1, which results in a dark area or a light-shielded area formed at the warpage B1 by the visible light screen L2. The dark area or the light-shielded area may help a user locate the position of the warpage (i.e., the location of the warpage B1) on the projection area C10 of the projection screen C. The user can further flatten the warpage B1 so as to improve the flatness of the projection area C10 of the projection screen C.

Figure 9:
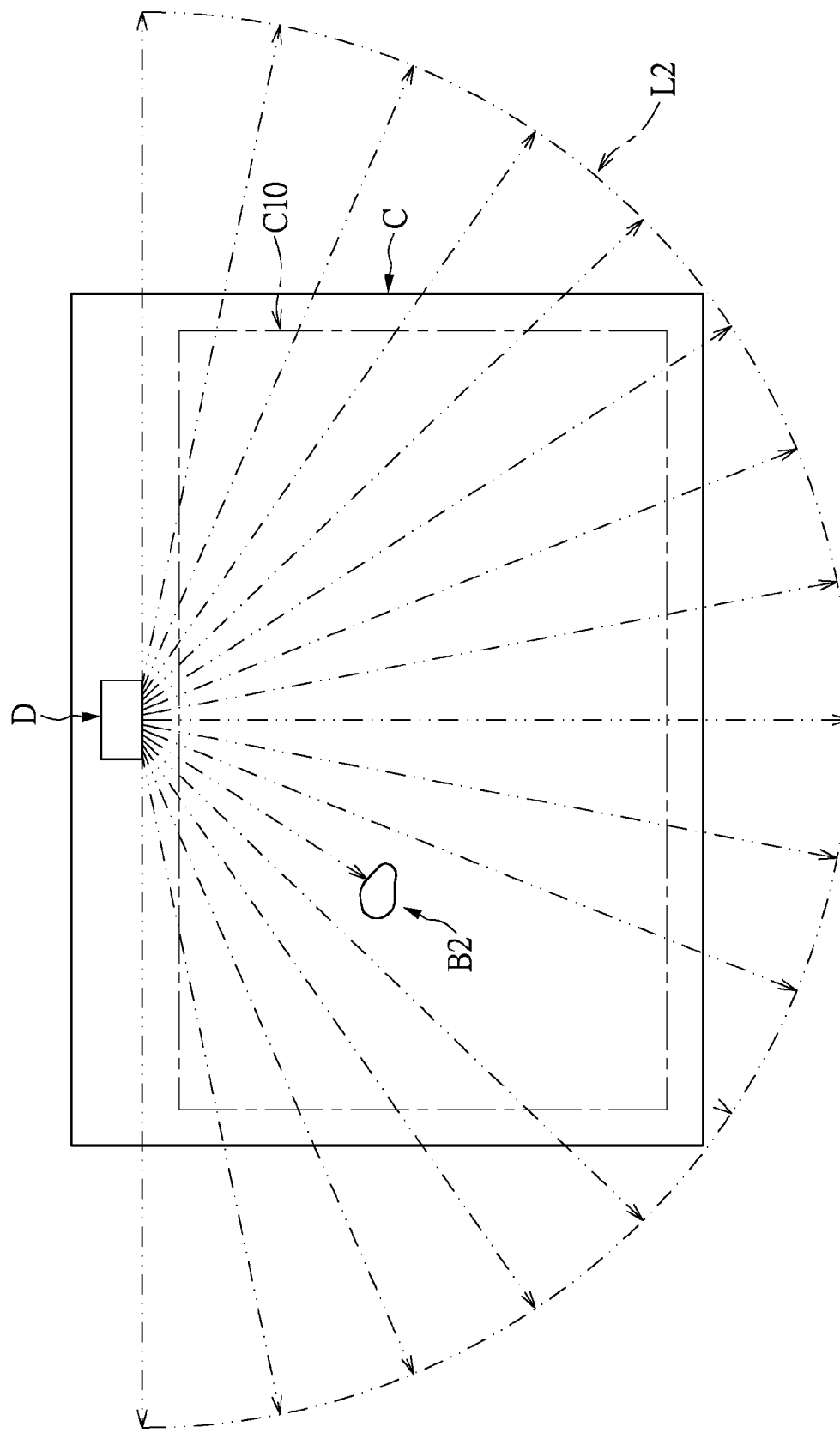
FIG. 9 is a top view of the visible light screen generated by the second light-emitting module of the light screen generating device projected on a protrusion.

For another example, with references made to FIGS. 6-7 and 9, after the parallelism of the visible light screen L2 and the spliced invisible light screen L1' corresponding to the projection area C10 of the projection screen C is adjusted (as shown in FIG. 6 and FIG. 7), the light screen L2 would detect the top of the projection area C10 of the projection screen C to determine whether a protrusion B2 is formed on the projection area C10 of the projection screen C and contacts the light screen L2. In other words, when the projection area C10 has a protrusion B2, a portion of the visible light screen L2 would project on the protrusion B2, which results in a dark area or a light-shielded area formed at the protrusion B2 by the visible light screen L2. The dark area or the light-shielded area may help a user locate the position of the protrusion on the projection area C10 of the projection screen C. The user can further remove the protrusion B2, so as to improve the flatness of the projection area C10 of the projection screen C.

Figure 10:
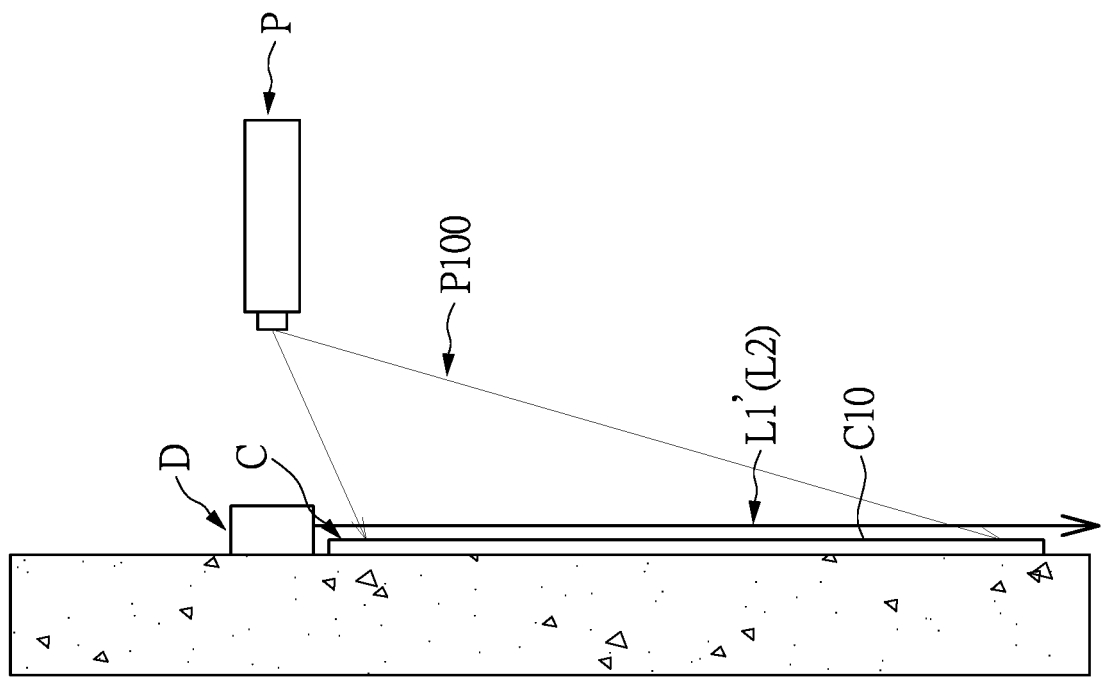
FIG. 10 is a side view of the projection system according to the present disclosure.
Figure 11:
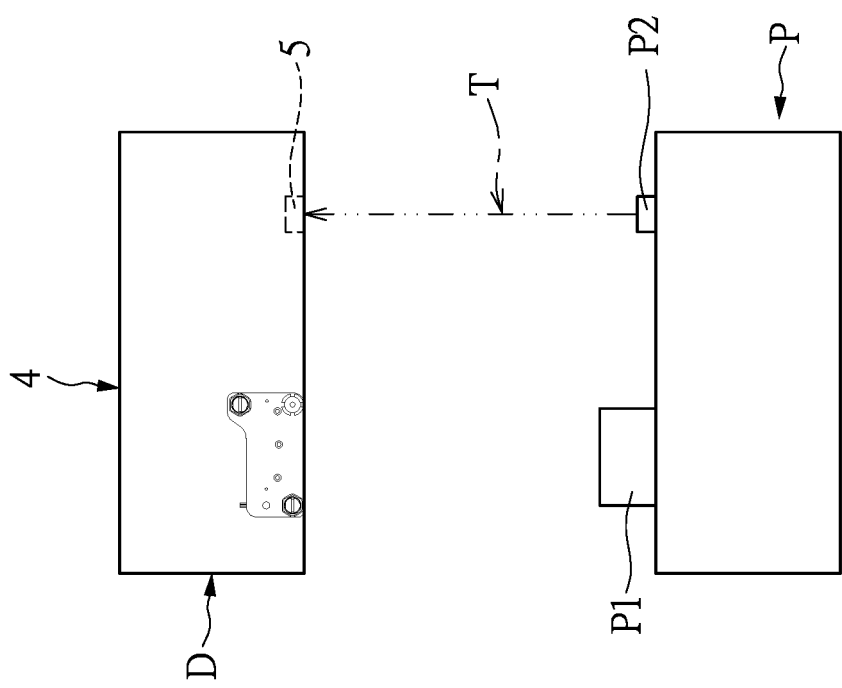
FIG. 11 is a top view illustrating the mutual cooperation of the projection device of the projection system and the light screen generating device according to the present disclosure.

Referring to FIGS. 1 and 10-11, a projection system S is provided by the present disclosure. The projection system includes: a projection screen C, a projection device P and a light screen generating device D. The projection screen C has a projection area C10. The projection device P is disposed in front of the projection screen C, and the projection device P can project an image light source P100 on the projection area C10 of the projection area C. The light screen generating device D is disposed on top of the projection area C10 of the projection screen C, and the light screen generating device D includes a movable carrier module 1, a first light-emitting module 2 for generating a spliced invisible light screen L1', and a second light-emitting module 3 for generating a visible light screen L2.

Furthermore, with references made to FIGS. 10 and 11, the projection device P and the light screen generating device D are separate from each other, and no transmission lines are disposed between the projection device P and the light screen generating device D. Moreover, the projection device P includes a projection lens P1 and a wireless signal transmitter P2, and the projection device P can provide the projection lens P1 with a lens turning-off-and-on timing signal T according to the turn-on and turn-off timing of the projection lens P1. Furthermore, the light screen generating device D may further include a wireless signal receiver 5 which is disposed on the outer shell 4 and corresponds to the wireless signal transmitter P2.

Accordingly, the lens turning-off-and-on timing signal T of the projection lens P1 is transmitted wirelessly to the wireless signal receiver 5, and the light screen generating device D turns on or off the first light-emitting module 2 according to the lens turning-off-and-on timing signal T received by the wireless signal receiver 6. In other words, according to the present disclosure, by the cooperation of the wireless signal transmitter P2 of the projection device P and the wireless signal receiver 5 of the light screen generating device D, the lens turning-off-and-on timing signal T of the projection lens P1 can be wirelessly transmitted to the light screen generating device D, so that the projection lens P1 of the projection device P and the first light-emitting module 2 can be turned on and off synchronously according to the lens turning-off-and-on timing signal T.

Effects of the Embodiment

In summary, the effects of the present disclosure are that, according to the projection system S and the light screen generating device D thereof of the present disclosure, by the design of "the first light-emitting module 2 including a plurality of first light-emitting structures 20 disposed on the movable carrier module 2" and "each first light-emitting structure 20 generates an invisible light screen L1, and the invisible light screens L1 respectively generated by the first light-emitting structures 20 are mated with each other to form a spliced invisible light screen L1' for increasing light emission uniformity," the situation of "the light screen being unable to cover the entire projection area C10 of the projection screen C uniformly due to excessive darkness" can be prevented, which further increases the light uniformity of the spliced invisible light screen L1'.

Furthermore, the projection system S and a light screen generating device D thereof provided by the present disclosure, by the design of "the second light-emitting module 3 including a second light-emitting structure 30 disposed on the movable carrier module 1, and the second light-emitting structure 30 generating a visible light screen L2 parallel to and overlapping the spliced invisible light screen L1'" and "the visible light screen L2 being close to and covering the projection area C10 of the projection screen C for determining a flatness of the projection area C10 of the projection screen C," can improve the flatness of the projection area C10 of the projection screen C.

Furthermore, the projection system S and a light screen generating device D thereof provided by the present disclosure, by the design of "the projection device P includes a projection lens P1 and a wireless signal transmitter P2, and the light screen generating device D includes a wireless signal receiver 5 corresponding to the wireless signal transmitter P2" and "the lens turning-off-and-on timing signal T of the projection lens P1 is transmitted wirelessly to the wireless signal receiver 5, and the light screen generating device D turns on or off the first light-emitting module 2 according to the lens turning-off-and-on timing signal T received by the wireless signal receiver 5," can simultaneously turn on and off the projection lens P1 of the projection device P and the first light-emitting module 2 of the light screen generating device D according to the lens turning-off-and-on timing signal T.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A light screen generating device applied to a projection screen, comprising:
   a movable carrier module;
   a first light-emitting module including a plurality of first light-emitting structures disposed on the movable carrier module, wherein each of the first light-emitting structures generates an invisible light screen, and the invisible light screens respectively generated by the first light-emitting structures are mated with each other to form a spliced invisible light screen for increasing light emission uniformity; and
   a second light-emitting module including a second light-emitting structure disposed on the movable carrier module, wherein the second light-emitting structure generates a visible light screen parallel to and overlapping the spliced invisible light screen;
   wherein the spliced invisible light screen and the visible light screen correspond to a projection area of the projection screen, and the first light-emitting module and the second light-emitting module, through the movement of the movable carrier module, synchronously adjust a parallelism of the visible light screen and the spliced invisible light screen corresponding to the projection area of the projection screen;
   wherein the visible light screen is close to and covers the projection area of the projection screen for determining a flatness of the projection area of the projection screen.

2. The light screen generating device according to claim 1, wherein the movable carrier module includes a movable carrier base for carrying the first light-emitting module and the second light-emitting module, and an adjusting mechanism disposed on the movable carrier base, wherein the adjusting mechanism includes a pivot structure, a levelness adjusting structure for adjusting a levelness of the movable carrier base corresponding to the projection area, and an inclination adjusting structure for adjusting an inclination of the movable carrier base corresponding to the projection area.

3. The light screen generating device according to claim 2, wherein the pivot structure includes a fixing part fixed on an outer shell, and a pivot part connected to the fixing part and movably contained in a pivot slot of the movable carrier base, wherein the levelness adjusting structure includes a first adjusting screw passing through the outer shell and the movable carrier base, and a first elastic element sleeving on the first adjusting screw and disposed between the outer shell and the movable carrier base, wherein the inclination adjusting structure includes a second adjusting screw passing through the outer shell and the movable carrier base, and a second elastic element sleeving on the second adjusting screw and disposed between the outer shell and movable carrier base.

4. The light screen generating device according to claim 1, wherein the visible light screen is distanced from the projection area of the projection screen at a predetermined distance, the visible light screen detects a top of the projection area of the projection screen to determine whether the projection area of the projection screen warps and contacts the visible light screen.

5. The light screen generating device according to claim 1, wherein the visible light screen is distanced from the projection area of the projection screen at a predetermined distance, the visible light screen detects a top of the projection area of the projection screen to determine whether the projection area of the projection screen has a protrusion that contacts the visible light screen.

6. The light screen generating device according to claim 1, wherein the first light-emitting module includes a middle light-emitting structure for generating a middle invisible light screen, a left-side light-emitting structure for generating a left-side inclination invisible light screen, and a right side light-emitting structure for generating a right-side inclination invisible light screen.

7. The light screen generating device according to claim 6, wherein the left-side light-emitting structure is disposed tiltedly relative to the middle light-emitting structure and disposed at the left side of the middle light-emitting structure, the right-side light-emitting structure is disposed tiltedly relative to the middle light-emitting structure and disposed at the right side of the middle light-emitting structure, the middle invisible light screen corresponds to a middle portion of the projection area, the left-side inclination invisible light screen and the middle invisible light screen partially overlap and correspond to a left-side portion of the projection area, and the right-side inclination invisible light screen and the middle invisible light screen partially overlap and correspond to a right-side portion of the projection area.

8. The light screen generating device according to claim 1, wherein each of the first light-emitting modules includes an infrared light-emitting element and a first pillar mirror disposed in front of the infrared light-emitting element, and the second light-emitting module includes an infrared light-emitting element and a second pillar mirror disposed in front of the infrared light-emitting element.

9. The light screen generating device according to claim 1, wherein the light screen generating device and a projection device disposed in front of the projection screen are separate from each other, the projection device includes a wireless signal transmitter, and the light screen generating device includes a wireless signal receiver corresponding to the wireless signal transmitter.

10. A projection system comprising:
a projection screen having a projection area;
a projection device disposed in front of the projection screen, wherein the projection device projects an image light source on the projection area of the projection screen; and
a light screen generating device disposed above the projection area of the projection screen, wherein the light screen generating device includes:
a movable carrier module;
a first light-emitting module including a plurality of first light-emitting structures disposed on the movable carrier module, wherein each of the first light-emitting structures generates an invisible light screen, and the invisible light screens respectively generated by the first light-emitting structures are mated with each other to form a spliced invisible light screen for increasing light emission uniformity; and
a second light-emitting module including a second light-emitting structure disposed on the movable carrier module, wherein the second light-emitting structure generates a visible light screen parallel to and overlapping the spliced invisible light screen;
wherein the spliced invisible light screen and the visible light screen correspond to a projection area of the projection screen, and the first light-emitting module and the second light-emitting module, through the movement of the movable carrier module, synchronously adjust a parallelism of the visible light screen and the spliced invisible light screen corresponding to the projection area of the projection screen;
wherein the visible light screen is close to and covers the projection area of the projection screen for determining a flatness of the projection area of the projection screen.

11. The projection system according to claim 10, wherein the projection device and the light screen generating device are separate from each other, the projection device includes a projection lens and a wireless signal transmitter, and the light screen generating device includes a wireless signal receiver corresponding to the wireless signal transmitter.

12. The projection system according to claim 11, wherein the projection device provides to the projection lens with a lens turning-off-and-on timing signal, the lens turning-off-and-on timing signal of the projection lens is transmitted wirelessly to the wireless signal receiver, and the light screen generating device turns on or off the first light-emitting module according to the lens turning-off-and-on timing signal received by the wireless signal receiver.

13. The projection system according to claim 10, wherein the movable carrier module includes a movable carrier base for carrying the first light-emitting module and the second light-emitting module, and an adjusting mechanism disposed on the movable carrier base, wherein the adjusting mechanism includes a pivot structure, a levelness adjusting structure for adjusting a levelness of the movable carrier base corresponding to the projection area, and an inclination adjusting structure for adjusting an inclination of the movable carrier base corresponding to the projection area.

14. The projection system according to claim 13, wherein the pivot structure includes a fixing part fixed on an outer shell, and a pivot part connected to the fixing part and movably contained in a pivot slot of the movable carrier base, wherein the levelness adjusting structure includes a first adjusting screw passing through the outer shell and the movable carrier base, and a first elastic element sleeving on the first adjusting screw and disposed between the outer shell and the movable carrier base, wherein the inclination adjusting structure includes a second adjusting screw passing through the outer shell and the movable carrier base, and a second elastic element sleeving on the second adjusting screw and disposed between the outer shell and movable carrier base.

15. The projection system according to claim 10, wherein the visible light screen is distanced from the projection area of the projection screen at a predetermined distance, the visible light screen detects a top of the projection area of the projection screen to determine whether the projection area of the projection screen warps and contacts the visible light screen.

16. The projection system according to claim 10, wherein the visible light screen is distanced from the projection area of the projection screen at a predetermined distance, the visible light screen detects a top of the projection area of the projection screen to determine whether the projection area of the projection screen has a protrusion that contacts the visible light screen.

17. The projection system according to claim 10, wherein the first light-emitting module includes a middle light-emitting structure for generating a middle invisible light screen, a left-side light-emitting structure for generating a left-side inclination invisible light screen, and a right side light-emitting structure for generating a right-side inclination invisible light screen.

18. The projection system according to claim 17, wherein the left-side light-emitting structure is disposed tiltedly relative to the middle light-emitting structure and disposed at the left side of the middle light-emitting structure, the right-side light-emitting structure is disposed tiltedly relative to the middle light-emitting structure and disposed at the right side of the middle light-emitting structure, the middle invisible light screen corresponds to a middle portion of the projection area, the left-side inclination invisible light screen and the middle invisible light screen partially overlap and correspond to a left-side portion of the projection area, and the right-side inclination invisible light screen and the middle invisible light screen partially overlap and correspond to a right-side portion of the projection area.

19. The projection system according to claim 10, wherein each first light-emitting module includes an infrared light-emitting element and a first pillar mirror disposed in front of the infrared light-emitting element, and the second light-emitting module includes an infrared light-emitting element and a second pillar mirror disposed in front of the infrared light-emitting element.

* * * * *